United States Patent [19]

Grundei et al.

[11] Patent Number: 4,993,524
[45] Date of Patent: Feb. 19, 1991

[54] DAMPING VALVE UNIT FOR A HYDRAULIC OSCILLATION DAMPER

[75] Inventors: Manfred Grundei, Niederwerrn; Hans Reimer, Waigolshausen, both of Fed. Rep. of Germany

[73] Assignee: Fichtel & Sachs AG, Schweinfurt, Fed. Rep. of Germany

[21] Appl. No.: 441,364

[22] Filed: Nov. 22, 1989

[30] Foreign Application Priority Data

Nov. 30, 1988 [DE] Fed. Rep. of Germany ....... 3840302

[51] Int. Cl.$^5$ ............................................. F16F 9/348
[52] U.S. Cl. ................. 188/322.22; 188/320; 188/322.15
[58] Field of Search ............... 188/285, 317, 319, 320, 188/322.13, 322.15, 322.22

[56] References Cited

FOREIGN PATENT DOCUMENTS 2264139  7/1973  Fed. Rep. of Germany .
2910381 10/1979  Fed. Rep. of Germany .
3015596 10/1981  Fed. Rep. of Germany .

*Primary Examiner*—Duane A. Reger
*Attorney, Agent, or Firm*—Brumbaugh, Graves, Donohue & Raymond

[57] ABSTRACT

According to an illustrative example of this invention, the piston of a hydraulic oscillation damper is provided with a traction valve, i.e. a valve which is intended to damp the outward movement of the piston rod. This traction valve includes two valve discs and a valve member. The valve member is biased towards a closed position and urges the valve discs against a valve face of the piston. In response to a predetermined pressure difference between the two working chambers on both sides of the piston, a flow passage is opened by lifting the valve discs and the valve member from the valve face. Below said predetermined pressure difference, a preliminary restricted flow passage exists. This preliminary restricted flow passage extends in series across the radially inner circumferential edge of a first valve disc adjacent to the piston and through radially inner edge recesses and through radially outer edge recesses of a second valve disc adjacent to the first valve disc. A first liquid flow resistance is established by the radially inner edge recesses, and a second liquid flow resistance is established by the radially outer edge recesses. The first liquid flow resistance is larger than the second flow resistance. Between respective radially inner edge recesses and respective radially outer edge recesses of the second valve disc, circumferential flow paths are established by a circumferential groove within the valve member. These circumferential flow paths act as tranquillizing paths.

8 Claims, 4 Drawing Sheets

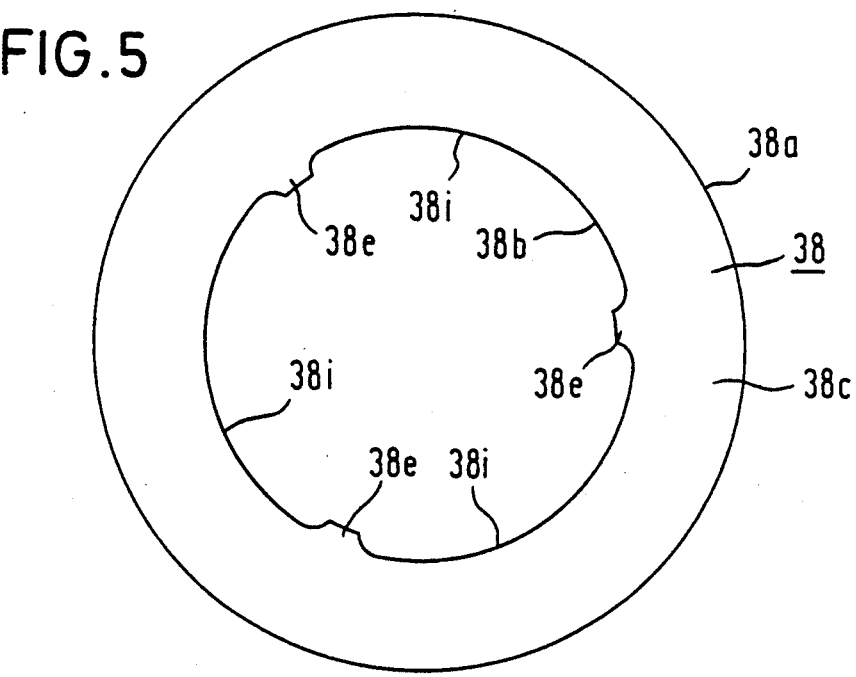
FIG.5
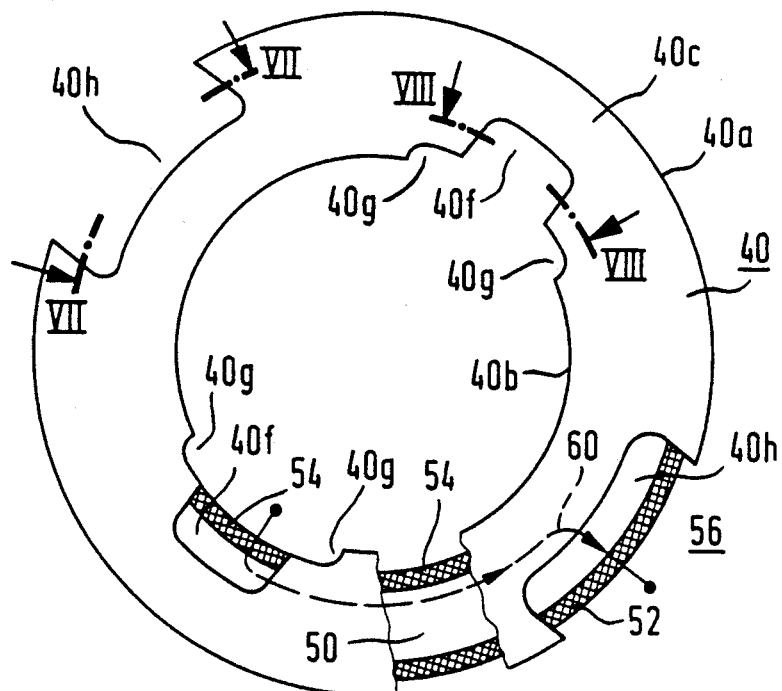
FIG.6
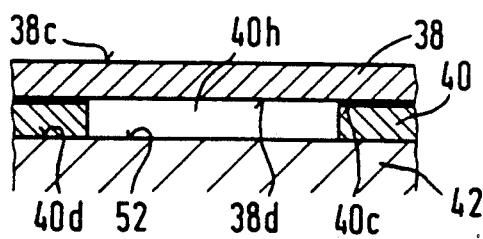
FIG.7
FIG.8

DAMPING VALVE UNIT FOR A HYDRAULIC OSCILLATION DAMPER

BACKGROUND OF THE INVENTION

This invention relates to a damping valve unit for a hydraulic oscillation damper of the type described as follows:

A damping valve unit comprises a basic constructional assembly. The basic constructional assembly has an axis, a radially outer cylindrical face and an axially directed annular valve face. The axially directed annular valve face surrounds the radially outer cylindrical face and is radially spaced from said radially outer cylindrical face.

The damping valve unit further comprises a first substantially planar valve disc axially movable along said radially outer cylindrical face and having a radially inner circumferential edge adjacent said radially outer cylindrical face, a radially outer circumferential edge, a first side face engageable with said axially directed annular valve face, and a second side face axially remote from said first side face.

The damping valve unit further comprises a second substantially planar valve disc, said second substantially planar valve disc being axially movable along said radially outer cylindrical face and having a radially inner circumferential edge adjacent said radially outer cylindrical face, a radially outer circumferential edge, a first side face adjacent said second side face of said first valve disc and a second side face axially remote from said first valve disc.

The damping valve unit further comprises an annular valve member axially slidable along said radially outer cylindrical face, said valve member having axially directed contact face means engageable with said second side face of said second valve disc and being axially biased towards said second side face of said second valve disc, such as to urge said second valve disc towards said first valve disc and said first valve disc towards said axially directed annular valve face.

A liquid distribution space means is provided adjacent said first side face of said first valve disc and radially inwards of said axially directed annular valve face. This liquid distribution space means is in liquid flow connection with a first working chamber of the hydraulic oscillation damper.

A liquid collection space means is provided adjacent the radially outer edges of said first and second valve disc. This liquid collection space means is in liquid flow connection with a second working chamber of the hydraulic oscillation damper.

The first valve disc is liftable from the axially directed annular valve face in response to a predetermined pressure difference between a higher liquid pressure within said first working chamber and a lower liquid pressure within said second working chamber, such as to open a liquid flow passage between said first working chamber and said second working chamber.

A preliminary restricted liquid flow passage exists between said liquid distribution space means and said liquid collection space means below said predetermined pressure difference. This preliminary liquid flow passage extends in series across the radially inner circumferential edge of said first valve disc, through radially inner edge recesses of said radially inner circumferential edge of said second valve disc and through radially outer edge recesses of said radially outer circumferential edge of said second valve disc.

This type of damping valve unit is e.g. used as a traction valve in a hydraulic oscillation damper. The traction valve is provided on a damping piston of the hydraulic oscillation damper and has the function to damp axially outward movement of the piston rod with respect to the cylinder of the hydraulic oscillation damper.

Hydraulic oscillation dampers, particularly for motor vehicles, are produced in large series. It is necessary that the oscillation dampers and the components thereof comprise simple parts easy to be manufactured. It is further necessary that the assembling of the hydraulic oscillation dampers and of its components is easy. Further it is necessary that the damping function is substantially identic for the hydraulic oscillation dampers of a series of production. A further request is that in operation of the hydraulic oscillation damper, noise resulting from liquid flow through the valves and particularly through the traction valve is substantially eliminated.

STATEMENT OF THE PRIOR ART

A damping valve unit of the type as described above is known from published German patent application Ser. No. 2,910,381. In this known construction, the radially inner edge recesses of the radially inner circumferential edge of the second valve disc do not provide a substantially throttling effect. The throttling effect therefore results only from the flow through the radially outer edge recesses of the radially outer circumferential edge of the second valve disc. It has been found that in this known construction, the noise elimination is not fully satisfactory.

Further solutions of damping valve units are known from published German application Ser. No. 2,234,139 and from published German application Ser. No. 30,15,596. These known constructions have the disadvantage that certain relationships of respective parts must be maintained in assembling the respective damping valve unit in order to make sure that the damping behaviour is substantially equal for different items of damping valve units within a series of production. Another disadvantage of these known constructions is that certain parts of the damping valve unit are difficult to be manufactured.

OBJECT OF THE INVENTION

It is a primary object of the invention to provide a damping valve unit of the above-described type in which the noise resulting from liquid flow through the preliminary restricted flow passage is substantially reduced.

A further object is to avoid complicated parts and to allow easy assembling. More particularly, the construction should be such that the various parts of the damping valve unit can be assembled without taking care of maintaining definite angular relative positions of the various parts. The damping behaviour should be equal for various items of damping valve units, irrespective of the relative angular position of the respective parts.

SUMMARY OF THE INVENTION

In view of the above objects, with a damping valve unit of the above-described type, the contact face means of the annular valve member comprises a radially inner annular axially directed contact face engageable with said second side face of said second valve disc adjacent the radially inner circumferential edge thereof and a radially outer annular axially directed contact face engageable with said second side face of said second valve disc adjacent the radially outer circumferential edge thereof. An annular recess is provided within said annular valve member radially between said radially inner annular axially directed contact face and said radially outer annular axially directed contact face. The radially inner edge recesses of the radially inner circumferential edge of said second valve disc extend radially outwards beyond said radially inner annular axially directed contact face, such as to open into said annular recess of said annular valve member. The radially outer edge recesses of said radially outer circumferential edge of said second valve disc extend radially inwards beyond said radially outer annular axially directed contact face of said annular valve member, such as to open into said annular recess of said annular valve member. The radially inner edge recesses of said radially inner circumferential edge of said second valve disc define a first liquid flow resistance of said preliminary restricted liquid flow passage between said distribution space means and said annular recess. The radially outer edge recesses of said radially outer circumferential edge of said second valve disc define a second liquid flow resistance of said preliminary liquid flow passage between said annular recess and said collection space means. The first liquid flow resistance is made larger than said second liquid flow resistance by corresponding selection of the number and dimension of the respective recesses.

The radially inner edge recesses of said radially inner circumferential edge of said second valve disc are circumferentially spaced from the radially outer edge recesses of said radially outer circumferential edge of said second valve disc, such as to establish circumferentially extending flow paths within said annular recess between circumferentially subsequent radially inner and radially outer edge recesses.

The combination of a first higher liquid flow resistance, a circumferentially extending flow path and a second smaller liquid flow resistance within the preliminary restricted liquid flow passage results in a substantial elimination of noise and more particularly the elimination of hissing noise. The assembling is very easy because the radially inner edge recesses and the radially outer edge recesses are both provided on the second valve disc such that the relative position of respective radially inner and radially outer recesses is always identic independently of the relative angular position of the valve discs and the annular valve member. Such, one has a guarantee that the damping behaviour of different items of valve units within a production series is substantially equal. As the valve discs are substantially planar, they can be easily manufactured by stamping.

The assembling can be further facilitated by said first valve disc adjacent its radially inner circumferential edge having a plurality of radially inwardly projecting centering cams engageable with said radially outer cylindrical face such that inlet flow recesses extend circumferentially between subsequent centering cams.

The presence of the centering cams might have an influence on the flow characteristics of the preliminary restricted liquid flow passage, if the first and second valve discs are positioned in different angular relative positions. In order to reduce such possible influences, the radially inner edge recesses may be provided with circumferential extensions of reduced radial depth adjacent the radially outer cylindrical face. The circumferential length of said circumferential extensions should be at least equal to one half of the circumferential length of one of said cams and preferably at least equal to the circumferential length of one of said cams.

The influence on liquid flow behaviour resulting from the centering cams may be further reduced in that the radially inner annular axially directed contact face is separated from said radially outer cylindrical face by a gap, the radial width of said gap being approximately equal to the radial depth of said circumferential extensions.

The influence of the centering cams on the flow behaviour resulting from variation of angular positioning of the first and second valve discs may be further reduced in that said cams are circumferentially distributed along said radially inner edge of said first valve disc such and said radially inner recesses of the radial inner edge of said second valve disc are distributed along said radially inner edge of said second valve disc such that the remaining radially inner recesses are substantially free of overlapping with the remaining cams, if one of said radially inner recesses is in overlapping position with respect to one of said cams.

The first liquid flow resistance may be selected to be about twice said second liquid flow resistance. With such a relationship of flow resistances, the pressure difference between the first and the second working chamber is distributed along the preliminary restricted liquid flow passage such that about 75% of the pressure drop occurs across the first flow resistance, and about 25% of the pressure drop occurs across the second liquid flow resistance.

The various features of the invention are discussed especially in the accompanying claims which form a part of the disclosure. For the better understanding of the invention, its working advantages and specific effects, reference is now made to the accompanying drawings and the description, in which preferred forms of embodiment of the invention are discussed.

BRIEF DESCRIPTION OF THE DRAWINGS

The invention is represented in the accompanying drawings and will be described in greater detail below. In the drawings

FIG. 5 shows a plane view of a first valve disc;

FIG. 6 shows a plane view of a second valve disc including parts of a valve member positioned below said second valve disc;

FIG. 7 shows a partial section according to line VII—VII of FIG. 6, when the second valve disc is combined with the first valve disc and with the annular valve member;

FIG. 8 shows a partial section along line VIII—VIII of FIG. 6, when the second valve disc is combined with the first valve disc and the annular valve member;

FIG. 1 shows a suspension leg of a motor vehicle. This suspension leg comprises a double tube oscillation damper. One recognizes an outer container 10 and a cylinder 12 of the double tube oscillation damper. The cylinder 12 is positioned axially and radially within the outer container 10 by a bottom valve unit 14 and a piston rod guiding and sealing unit 16. A piston rod 18 extends inwards and outwards of the cylinder 12 and is provided with a piston 20. A first working chamber 22 is provided above the piston 20, and a second working chamber 24 is provided below the piston 20. An annular chamber 26 is defined between the container 10 and the cylinder 12. The working chambers 22 and 24 are filled with a liquid, e.g. a hydraulic oil. The annular chamber 26 is partially filled with liquid and partially filled with gas or air.

Figure 1:
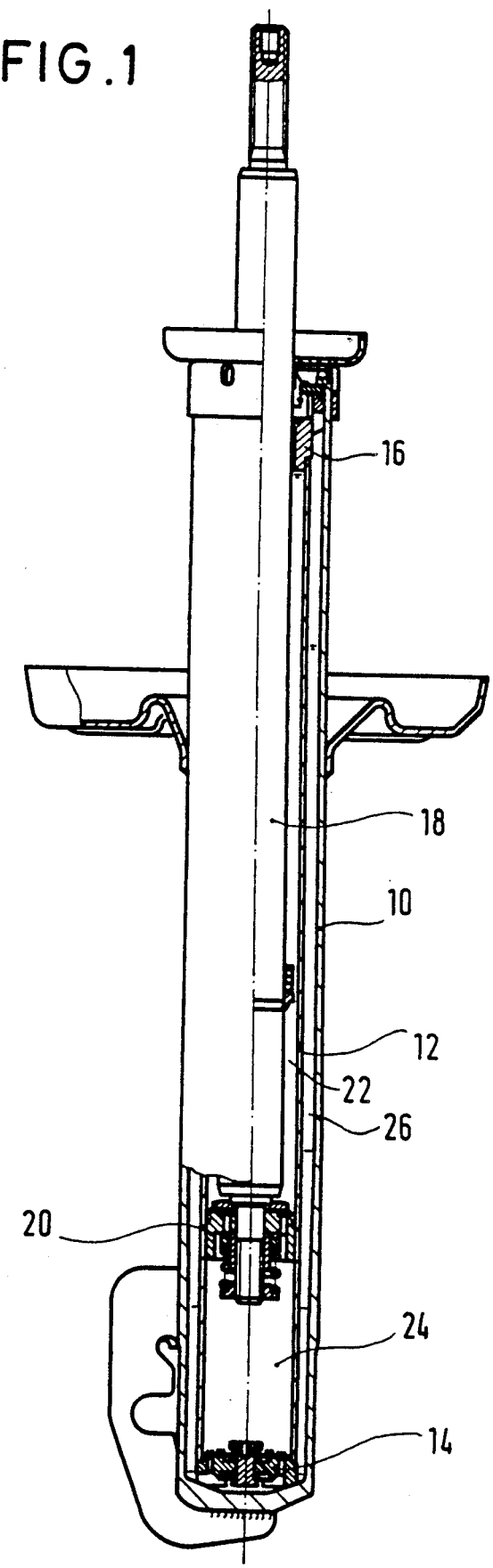
FIG. 1 shows a longitudinal section of an oscillation damper being a part of a suspension leg.
Figure 2:
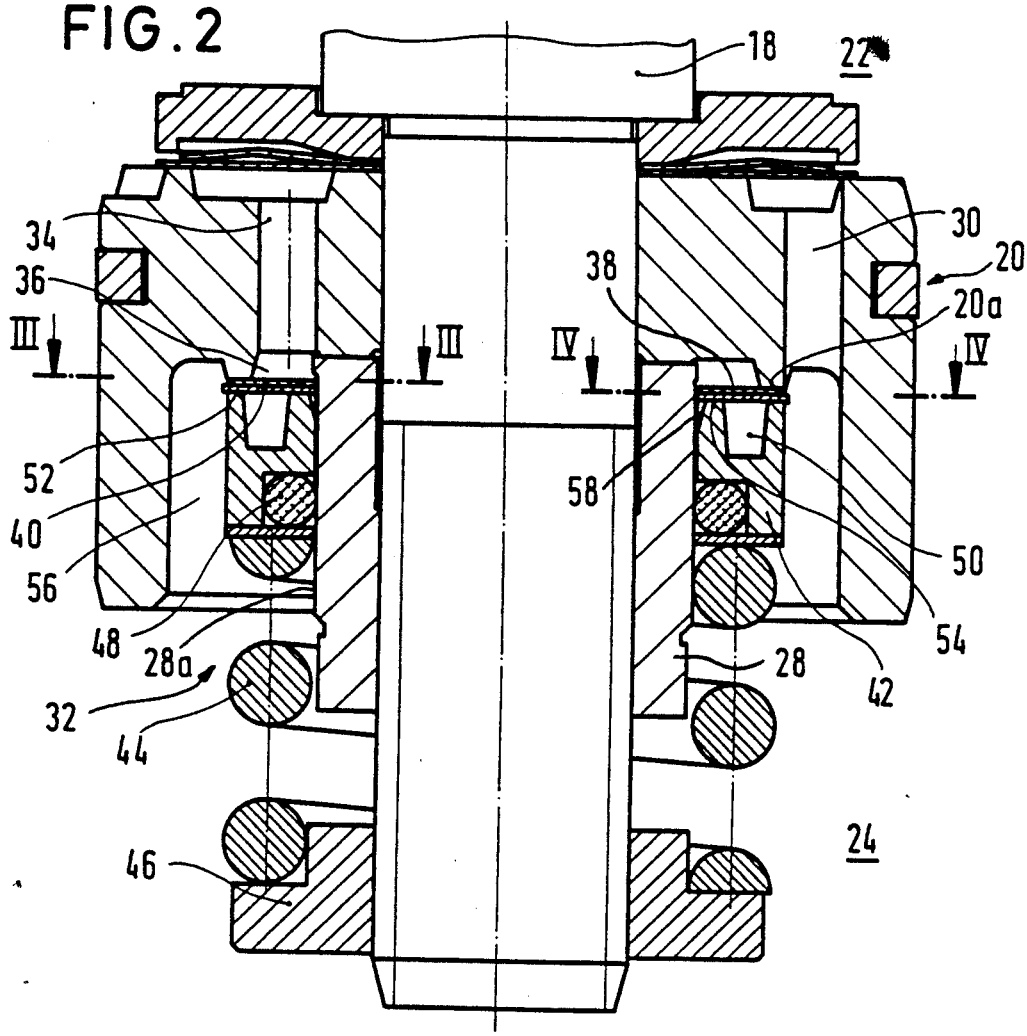
FIG. 2 shows a longitudinal section of the damping valve in an enlarged representation.

The piston 20 is in more detail shown in FIG. 2. The piston 20 is fixed to the inner end of the piston rod 18 by a sleeve member 28 screwed to a threaded end section of the piston rod 18. The piston 20 is provided with axial bores 30 which permit liquid flow on inward movement of the piston rod with respect to the cylinder. Moreover, the piston 20 is provided with a damping valve unit 32 which allows a damped flow of liquid on outward movement of the piston rod 18 with respect to the cylinder 12. This damping valve unit comprises a plurality of axial bores 34 which open into an annular distribution space 36 provided on the lower side of the piston 20. The sleeve member 28 is provided with a radially outer face 28a. The piston member 20 is provided with a valve face 20a. A first valve disc 38 is axially movable along the cylindrical face 28a and is in contact with the valve face 20a. A second valve disc 40 is in contact with the lower side of the first valve disc 38. An annular valve member 42 is slidably mounted on the cylindrical face 28a and is biased by a helical spring 44 against the second valve disc 40 such that the second valve disc is urged against the first valve disc 38, and the first valve disc 38 is urged against the valve face 20a. The helical spring 44 is supported by a support nut 46, which is screwed on the threaded lower end of the piston rod 18. A sealing ring member 48 is provided between the valve member 42 and the radially outer cylindrical face 28a. The valve member 42 is provided with a circumferentially extending recess 50. A radially inner contact face 54 is provided radially inwards of the circumferentially extending recess 50, and a radially outer contact face 52 is provided on the valve member 42 radially outwards of the circumferential recess 50. Both contact faces 52 and 54 are in contact with the second valve disc 40.

The bores 34 are in liquid flow connection with the first working chamber 22. A collection space 56 is provided within the piston member 20 adjacent the radially outer edges of the valve discs 38 and 40.

When in operation, the piston rod member 18 moves axially upwards, the pressure of the liquid within the working chamber 22 is increased, and the pressure of the liquid within the working chamber 24 is reduced. At a predetermined pressure difference the valve discs 38 and 40 are lifted from the valve face 20a so that liquid flow can occur from the working chamber 22 to the working chamber 24.

Even below said predetermined pressure difference, a preliminary restricted liquid flow passage exists between the annular distribution space 36 and the annular collection space 56. This preliminary restricted liquid flow passage is established by the valve discs 38 and 40 and the circumferential recess 50 of the annular valve member 42. For more detail it is referred to the FIGS. 5, 6, 7 and 8.

FIG. 5 shows the first valve disc 38. This first valve disc has a radially outer circumferential edge 38a, a radially inner circumferential edge 38b, a first side face 38c and a second side face 38d (see FIGS. 7 and 8). The first side face 38c is in contact with the valve face 20a of the piston 20 (see FIG. 2). The radially inner circumferential edge 38b is provided with three centering cams 38e which are to engage the radially outer cylindrical face 28a (see FIG. 2). Inlet flow recesses 38i are provided between subsequent centering cams 38e.

The second valve disc 40 is shown in FIG. 6. This second valve disc 40 has a radially outer circumferential edge 40a, a radially inner circumferential edge 40b, a first side face 40c and a second side face 40d. The first side face 40c of the second valve disc 40 is in contact with the second side face 38d of the first valve disc 38, whereas the second side face 40d of the second valve disc 40 is in contact with the contact faces 52 and 54 of the annular valve member 42.

The radially inner circumferential edge of the second valve disc 40 is provided with radially inner edge recesses 40f. The radial depth of the radially inner edge recesses 40f is such that they extend radially outwards beyond the radially inner contact face 54 of the valve member 42, as can be seen in FIG. 6. The radially inner edge recesses 40f are provided with circumferential extensions 40g of reduced radial depth. This reduced radial depth of the circumferential extensions 40g corresponds approximately to the radial width of a circumferential gap 58 (FIG. 2) which separates the radially inner contact face 52 from the radially outer cylindrical face 28a, as seen in FIG. 2.

The radially outer circumferential edge 40a of the second valve disc 40 is provided with radially outer edge recesses 40h. The radial depth of said radially outer edge recesses 40h is such that they extend radially inwards of the radially outer contact face 52, as one can see from FIG. 6.

Both the radially inner edge recesses 40f and the radially outer edge recesses 40h are open to the circumferential recess 50, as can be seen from FIG. 6. Further, one can see from FIG. 6 that the radially inner edge recess 40f and the radially outer edge recess 40h are circumferentially spaced.

It is assumed now that the cams 38c are positioned such that they are free of overlapping with the radially inner circumferential edge recesses 40f. Liquid can flow from the annular distribution space 36 through the inflow recesses 38i of the first valve disc 38 into the radially inner edge recesses 40f of the second valve disc 40 axially along the cylindrical outer face 28a and through the radially inner edge recesses 40f across the radially inner contact face 54 into the circumferentially extending recess 50 of the annular valve member 42. Hereupon the liquid can further flow in circumferential direction along the circumferential recess 50 to the adjacent radially outer edge recess 40h as indicated by the arrow line 60 in FIG. 6. Through the recess 40h the liquid can flow across the radially outer contact face 52, as again indicated in FIG. 6. Finally, the liquid can flow into the collection chamber 56 and from the collection chamber 56 into the second working chamber 24. The arrow line 60 in FIG. 6 shows the complete preliminary restricted liquid flow passage which is always open independently of the pressure difference between the first working chamber 22 and the second working chamber 24.

If against the above made assumption a cam 38e is accidentally positioned in assembling in overlapping relationship with a radially inner edge recess 40f, the flow resistance through the respective edge recess 40f is not essentially reduced due to the presence of the circumferential extensions 40g and possibly also due to the presence of the gap 58 as shown in FIG. 2. Therefore, it is not necessary to take care of the relative angular position of the valve discs 38 and 40.

It is to be noted that the number of cams 38e is three, whereas the number of radially inner edge recesses 40f is two. This means that if one of the centering cams 38e overlaps with one of the radially inner edge recesses 40f, remaining centering cams 38e are not in overlapping relationship with the remaining radially inner edge recess 40f. This is a further reason for the advantageous result that the first liquid flow resistance as defined by the radially inner edge recesses 40f is substantially independent of the relative angular position of the valve discs 38 and 40. As a general rule, it can be stated that the number of the centering cams 38e and the number of the radially inner edge recesses 40f should not have a common even number divisor.

As can be seen from FIG. 8, the first liquid flow resistance is defined by a number of substantially rectangular orifices defined by the radially inner edge recesses 40f, the contact face 54 and the first valve disc 38.

As can be seen from FIG. 7, the second liquid flow resistance is defined by a number of orifices of rectangular cross-section defined by the radially outer edge recesses 40h, the first valve disc 38 and the contact face 52.

The circumferential path between subsequent radially inner edge recesses 40f and radially outer edge recesses 40h along the circumferential recess 50 acts as a tranquilizing path. It is to be noted that the sum of the cross-sectional areas of the orifices 40f is smaller than the sum of the cross-sectional areas of the orifices 40h. As a result, the flow resistance between the distribution space 36 and the circumferential recess 50 is larger than the flow resistance between the circumferential recess 50 and the collection space 56. Moreover, the flow resistance through each single recess 40f is larger than the flow resistance through each subsequent edge recess 40h. The flow resistance in the tranquilizing path between subsequent radially inner edge recesses 40f and radially outer edge recesses 40h is negligeable as compared with the flow resistance of the edge recesses themselves.

Figures 3, 4:
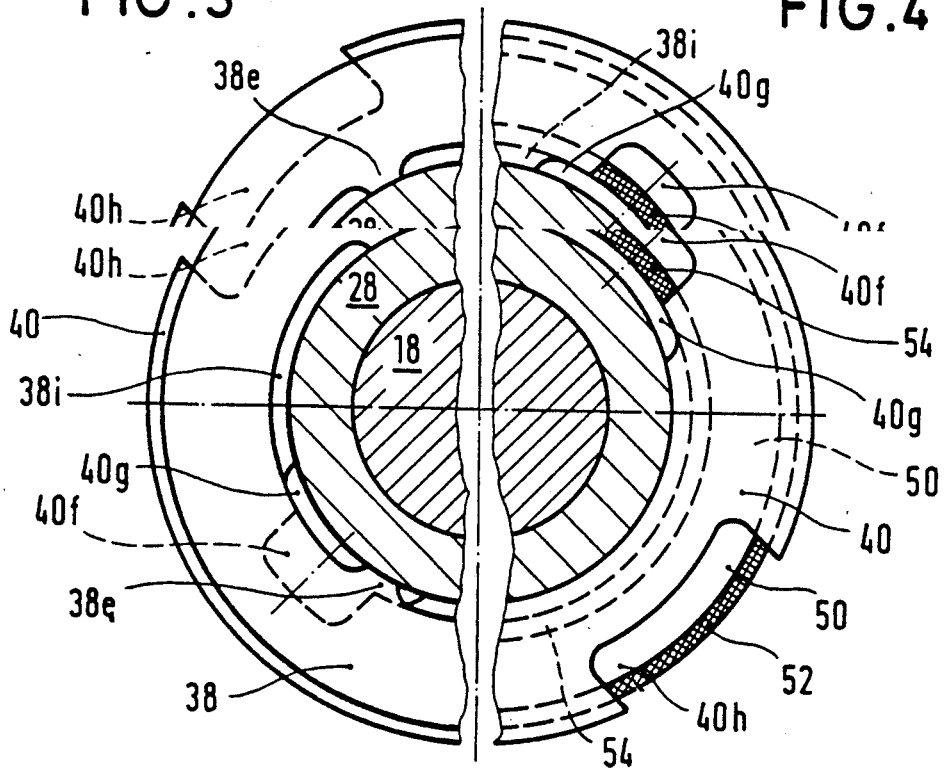
FIG. 3 shows a section according to line III—III of FIG. 2.
FIG. 4 shows a section according to line IV—IV of FIG. 2.

FIG. 3 shows a plane view onto the first valve disc 38.

In FIG. 4 one sees a plane view on the second valve disc 40.

FIG. 3 shows one of the centering cams 38e in overlapping relationship with respect to a radially inner recess 40f and more particularly with a circumferential extension 40g.

The predetermined pressure difference at which the valve disc 38 is lifted from the valve face 20a is selectable by the biasing action of the helical spring 44 and can be adjusted by the position of the support nut 46.

It is easily understandable that the flow resistances can be adjusted by selection of the axial thickness of the valve disc 40 without changing the inner and outer contours of the valve disc 40.

In the embodiment of FIGS. 2 to 8 the cross-sectional areas of the flow path defined by the radially inner edge recesses 40f is about one half of the cross-sectional area defined by the radially outer edge recesses 40h. It has been found that with this construction hissing noises are substantially eliminated.

Figure 9:
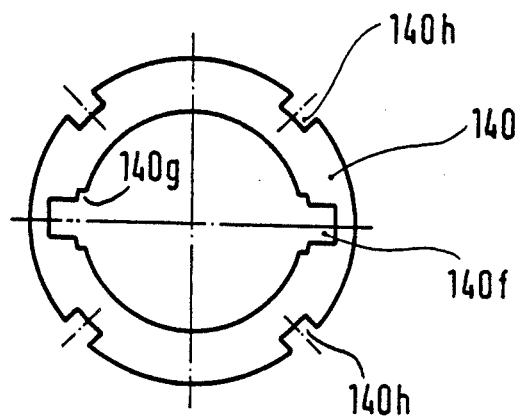
FIG. 9 shows a plane view of a further embodiment of the second valve disc.
Figure 10:
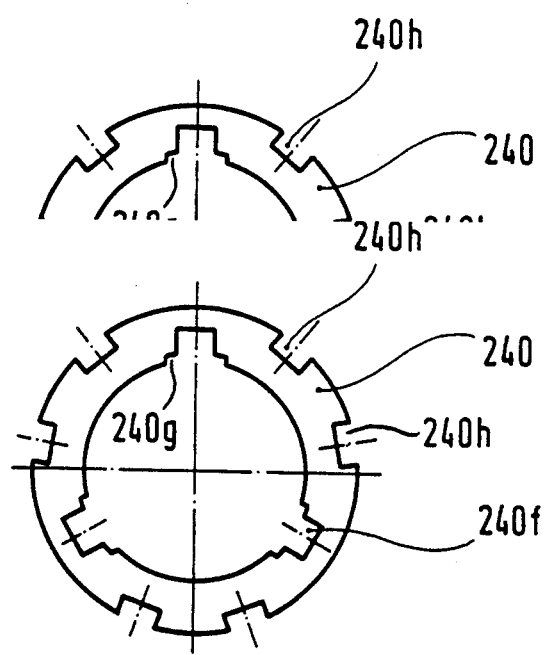
FIG. 10 shows still another embodiment of a second valve disc.

Further embodiments of the second valve disc 140 and 240 are shown in FIGS. 9 and 10. Equal elements are designated by the reference numbers as in FIG. 6, the respective reference number being increased by 100 and 200, respectively.

It is to be noted that in the embodiment of FIG. 9 the number of radially outer edge recesses 140h is larger than the number of the radially inner edge recesses 140f so that again the first flow resistance is larger than the second flow resistance.

In FIG. 10 the number of radially inner edge recesses 240f is three, and the number of radially outer edge recesses 240h is six so that again the first flow resistance is larger than the second flow resistance.

For the embodiment of the second valve disc as shown in FIGS. 9 and 10, the respective first valve discs are again selected so that only one centering cam can overlap one radially inner edge recess 140f and 240f, respectively, at a maximum.

It is to be noted that the distribution space means 36 and the collection space means 56 can be established by the working chambers 22 and 24 themselves and are not necessarily defined as specific spaces.

Specific forms of embodiment of the invention have been represented and described in order to illustrate the use of the principles of the invention. Of course, the invention can also be realized in other ways without departing from these principles.

The reference numbers in the claims serve only for facilitation of understanding and are not to be understood as a limitation.

We claim:

1. A damping valve unit for a hydraulic oscillation damper,
    said damping valve unit (32) comprising a basic constructional assembly (18,20,28), said basic constructional assembly (18,20,28) having an axis, a radially outer cylindrical face (28a) and an axially directed annular valve face (20a), said axially directed annular valve face (20a) surrounding said radially outer cylindrical face (28a) and being radially spaced from said radially outer cylindrical face (28a),
    said damping valve unit (32) further comprising a first substantially planar valve disc (38) axially movable along said radially outer cylindrical face (28a) and having a radially inner circumferential edge (38b) adjacent said radially outer cylindrical face (28a), a radially outer circumferential edge (38a), a first side face (38c) engageable with said axially directed annular valve face (20a), and a second side face (38d) axially remote from said first side face (38c),
    said damping valve unit (32) further comprising a second substantially planar valve disc (40), said second substantially planar valve disc (40) being axially movable along said radially outer cylindrical face (28a) and having a radially inner circumferential edge (40b) adjacent said radially outer cylindrical face (28a), a radially outer circumferential edge (40a), a first side face (40c) adjacent said second side face (38d) of said first valve disc (38) and a second side face (40d) axially remote from said first valve disc (38),
    said damping valve unit (32) further comprising an annular valve member (42) axially slidable along said radially outer cylindrical face (28a), said annular valve member (42) having axially directed contact face means (52,54) engageable with said second side face (40d) of said second valve disc (40) and being axially biased towards said second side face (40d) of said second valve disc (40), such as to urge said second valve disc (40) towards said first valve disc (38) and said first valve disc (38) towards said axially directed annular valve face (20a), a liquid distribution space means (36) being provided adjacent said first side face (38c) of said first valve disc (38) and radially inwards of said axially directed annular valve face (20a), said liquid distribution space means (36) being in liquid connection with a first working chamber (22) of said hydraulic oscillation damper, a liquid collection space means (56) being provided adjacent the radially outer edges (38a,40a) of said first and second valve disc (38,40), said liquid collection space means (56) being in liquid flow connection with a second working chamber (24) of said hydraulic oscillation damper, said first valve disc (38) being liftable from said axially directed annular valve face (20a) in response to a predetermined pressure difference between a higher liquid pressure within said first working chamber (22) and a lower liquid pressure within said second working chamber (24), such as to open a liquid flow passage between said first working chamber (22) and said second working chamber (24), a preliminary restricted liquid flow passage (60) existing between said liquid distribution space means (36) and said liquid collection space means (56) below said predetermined pressure difference, said preliminary liquid flow passage (60) extending in series across the radially inner circumferential edge (38b) of said first valve disc (38), through radially inner edge recesses (40f) of said radially inner circumferential edge (40b) of said second valve disc (40) and through radially outer edge recesses (40h) of said radially outer circumferential edge (40a) of said second valve disc (40), said contact face means (52,54) of said annular valve member (42) comprising a radially inner annular axially directed contact face (54) engageable with said second side face (40d) of said second valve disc (40) adjacent the radially inner circumferential edge (40b) thereof and a radially outer annular axially directed contact face (52) engageable with said second side face (40d) of said second valve disc adjacent the radially outer circumferential edge (40a) thereof, an annular recess (50) being provided within said annular valve member (42) radially between said radially inner annular axially directed contact face (54) and said radially outer annular axially directed contact face (52), said radially inner edge recesses (40f) of said radially inner circumferential edge (40b) of said second valve disc (40) extending radially outwards beyond said radially inner annular axially directed contact face, such as to open into said annular recess (50) of said annular valve member (42), said radially outer edge recesses (40h) of said radially outer circumferential edge (40a) of said second valve disc (40) extending radially inwards beyond said radially outer annular axially directed contact face (52) of said annular valve member (42), such as to open into said annular recess (50) of said annular valve member (42), said radially inner edge recesses (40f) of said radially inner circumferential edge (40b) of said second valve disc (40) defining a first liquid flow resistance of said preliminary restricted liquid flow passage (60) between said distribution space means (36) and said annular recess (50), said radially outer edge recesses (40h) of said radially outer circumferential edge (40a) of said second valve disc (40) defining a second liquid flow resistance of said preliminary liquid flow passage (60) between said annular recess (50) and said collection space means (56), said first liquid flow resistance being larger than said second liquid flow resistance, said radially inner edge recesses (40f) of said radially inner circumferential edge (40b) of said second valve disc (40) being circumferentially spaced from the radially outer edge recesses (40h) of said radially outer circumferential edge (40a) of said second valve disc (40), such as to establish circumferentially extending flow paths within said annular recess (50) between circumferentially subsequent radially inner and radially outer edge recesses (40f,40h).

2. A damping valve unit as set forth in claim 1, said first valve disc (38) being provided adjacent its radially inner circumferential edge (38b) with a plurality of radially inwardly projecting centering cams (38e) engageable with said radially outer cylindrical face (28a), inlet flow recesses (38i) extending circumferentially between subsequent centering cams (38e).

3. A damping valve unit as set forth in claim 1, said radially inner edge recesses (40f) being provided with circumferential extensions (40g) of reduced radial depth adjacent the radially outer cylindrical face (28a).

4. A damping valve unit as set forth in claim 3, said circumferential extensions (40g) having a circumferential length at least equal to one half of the circumferential length of one of said cams (38e).

5. A damping valve unit as set forth in claim 3, the circumferential length of one of said circumferential extensions (40g) being at least equal to the circumferential length of one of said cams (38e).

6. A damping valve unit as set forth in claim 3, said radially inner annular axially directed contact face (54) being separated from said radially outer cylindrical face (28a) by a gap (58) the radial width of said gap (58) being approximately equal to the radial depth of said circumferential extensions (40g).

7. A damping valve unit as set forth in claim 2, said centering cams (38e) being circumferentially distributed along said radially inner edge (38b) of said first valve disc (38) such and said radially inner edge recesses (40f) of the radial inner edge (40b) of said second valve disc (40) being distributed along said radially inner edge (40b) of said second valve disc (40) such that the remaining radially inner edge recesses (40f) are substantially free of overlapping with the remaining cams (38e), if one of said radially inner edge recesses (40f) is in overlapping position with respect to one of said cams (38e).

8. A damping valve unit as set forth in claim 1, said first liquid flow resistance being about twice said second liquid flow resistance.

* * * * *

UNITED STATES PATENT AND TRADEMARK OFFICE
CERTIFICATE OF CORRECTION

PATENT NO. : 4,993,524

DATED : February 19, 1991

INVENTOR(S) : Manfred Grundei and Hans Reimer

It is certified that error appears in the above-identified patent and that said Letters Patent is hereby corrected as shown below:

Col. 10, line 48, "(58)" should read --(58), --;
Col. 10, line 54, "(38)" should read --(38), --.

Signed and Sealed this

First Day of September, 1992

Attest:

DOUGLAS B. COMER

Attesting Officer

Acting Commissioner of Patents and Trademarks